United States Patent [19]
Horton

[11] Patent Number: 6,116,430
[45] Date of Patent: Sep. 12, 2000

[54] FILTRATION APPARATUS

[75] Inventor: David Robert Horton, North Bondi, Australia

[73] Assignee: Aligned Concepts Pty. Ltd., Sydney, Australia

[21] Appl. No.: 09/269,872

[22] PCT Filed: Oct. 2, 1997

[86] PCT No.: PCT/AU97/00667
§ 371 Date: Jul. 12, 1999
§ 102(e) Date: Jul. 12, 1999

[87] PCT Pub. No.: WO98/14262
PCT Pub. Date: Apr. 9, 1998

[30] Foreign Application Priority Data

Oct. 2, 1996 [AU] Australia ................................. PO2721

[51] Int. Cl.[7] .................................................. B01D 21/18
[52] U.S. Cl. ........................................... 210/411; 210/407
[58] Field of Search ................................... 210/769, 772, 210/411, 407

[56] References Cited

U.S. PATENT DOCUMENTS 4,097,382  6/1978  Cruea ........................................ 210/456

FOREIGN PATENT DOCUMENTS

91/78034  12/1991  Australia .
0002237   6/1979   European Pat. Off. .
2242372   10/1991  United Kingdom .

Primary Examiner—David A. Simmons
Assistant Examiner—Chester T Barry
Attorney, Agent, or Firm—Arnold White & Durkee

[57] ABSTRACT

A filtration apparatus (10) for fluids containing solid matter and/or particles or the like is disclosed. The apparatus (10) comprises screen means (20) and barrier means (21) substantially adjacent and behind the screen means (20). The barrier means (21) has a plurality of corrugated ribs (23) with vent means (22) therein. The corrugated ribs (23) are elongate and parallel and are substantially concave corrugations when seen from the direction from where the fluid is coming while the corrugations are substantially aligned with the direction of the flow of the fluid.

18 Claims, 8 Drawing Sheets

Direction of Fluid

FILTRATION APPARATUS

The present invention relates to filtration and, in particular, to a filtration apparatus in which a fluid, preferably water, passes through a fine mesh screen entrapping solid matter or particles which is/are cleared from the fine mesh screen allowing the filtration apparatus to more efficiently remove the solid matter or particles from the fluid.

BACKGROUND TO THE INVENTION

Within the filtration industry, and with particular regard to the filtration of sewage in a sewerage treatment works, there are problems associated with the filtration of solid matter and/or particles through screen meshes and the like. In the particular case of a sewerage treatment works, the presence of mashed toilet paper as the solid matter and/or particles in the already primary treated sewage causes problems with fine mesh screens. This is because the mashed toilet paper is cellulose which tends to be entrapped by the fine mesh screen and thereby builds up to be an obstruction to the efficient passing of the primary treated sewage, which at this stage of the treatment is relatively clean water with a certain amount of impurities dissolved therein. As the cellulose is entrapped the efficiency of the treatment of the filtration process decreases and therefore regular clearing, cleaning and maintenance of the fine mesh screens is required.

Therefore it would be advantageous to provide a filtration apparatus in which a fluid, preferably water, passes through a fine mesh screen entrapping solid matter or particles which is/are cleared from the fine mesh screen while the apparatus is being used. Such an apparatus would improve the efficiency of the filtration process as less regular clearing, cleaning and maintenance would be required.

Although the foregoing and following description refers primarily to filtration apparatus for sewerage or water treatment works, it will be readily appreciated that the filtration apparatus of the present invention would be suitable for the filtration of other liquids as well as gases as the filtration apparatus is suitable for filtering solid matter and/or particles which are present in a variety of fluids.

OBJECT OF THE INVENTION

It is an object of the present invention to provide an improved filtration apparatus which substantially overcomes or ameliorates the above mentioned disadvantages. At the very least, the object of the invention is to provide an alternative to known filtration devices.

SUMMARY OF THE INVENTION

According to one aspect of the present invention there is provided a filtration apparatus comprising:

a filter screen arranged so as to filter solid matter and/or particles or the like from a fluid stream passing through the filter screen; and, a barrier means located on a downstream side of an adjacent to said filter screen and having a plurality of reflector ribs provided therein, each of said reflector ribs having a concave surface facing substantially in an upstream direction, wherein a portion of the fluid passing through the filter screen is directed back towards the filter screen, the barrier means also having fluid vents provided therein to allow fluid to pass through the barrier means whereby, in use, the fluid directed back towards the filter screen dislodges any solid matter and/or particles held thereon so as to clear the filter screen and maintain fluid flow therethrough.

Preferably said barrier means further comprises a plurality of intermediate deflector ribs provided therein, each of said deflector ribs having a convex surface facing substantially in said upstream direction.

Typically said plurality of reflector ribs are substantially parallel and said plurality of deflector ribs are parallel, and wherein said convex surfaces of the deflector ribs and said concave surface of the reflector ribs are aligned so as to form a corrugated surface of the barrier means facing substantially in an upstream direction.

In a preferred form of the invention, the filtration apparatus is located in a housing having an inlet and an outlet for the passage of the fluid and a sediment collection chamber. Preferably a control baffle means controls the flow of the fluid into the sediment collection chamber which has a sediment flush means to remove the sediment therefrom.

In the preferred form the housing comprises an inlet pipe constituting the inlet, an outlet pipe constituting the outlet and a sediment collection pipe constituting the sediment collection chamber. Preferably the diameter of the inlet pipe and the outlet pipe are substantially the same while the diameter of the sediment collection pipe is larger. Preferably the filtration apparatus covers the outlet pipe at a three way junction of the inlet pipe, the outlet pipe and the sedimentation pipe. The control baffle means is preferably also located at this three way junction.

Preferably, the three way junction has an angle of 74.79° between the outlet pipe and the sediment collection pipe, an angle of 154.81° between the outlet pipe and the inlet pipe and therefore an angle of 132.90° between the inlet pipe and the sediment collection pipe.

The inlet pipe preferably has a bend having an angle of 154° with the inlet pipe having at its inlet a pipe parallel but therefore offset to the outlet pipe. The preferred angles of the three way junction and the inlet pipe bend assist in the flow of the fluid in the housing.

In this preferred form, the filtration apparatus has the form of an oval dish shaped body to fit into the circular pipe at an oblique angle. The oval dish shaped body protrudes towards the outlet pipe.

BRIEF DESCRIPTION OF THE DRAWINGS

The present invention will be now be described with reference to the accompanying drawings in which.

BEST MODE OF CARRYING OUT THE INVENTION

Figure 1:
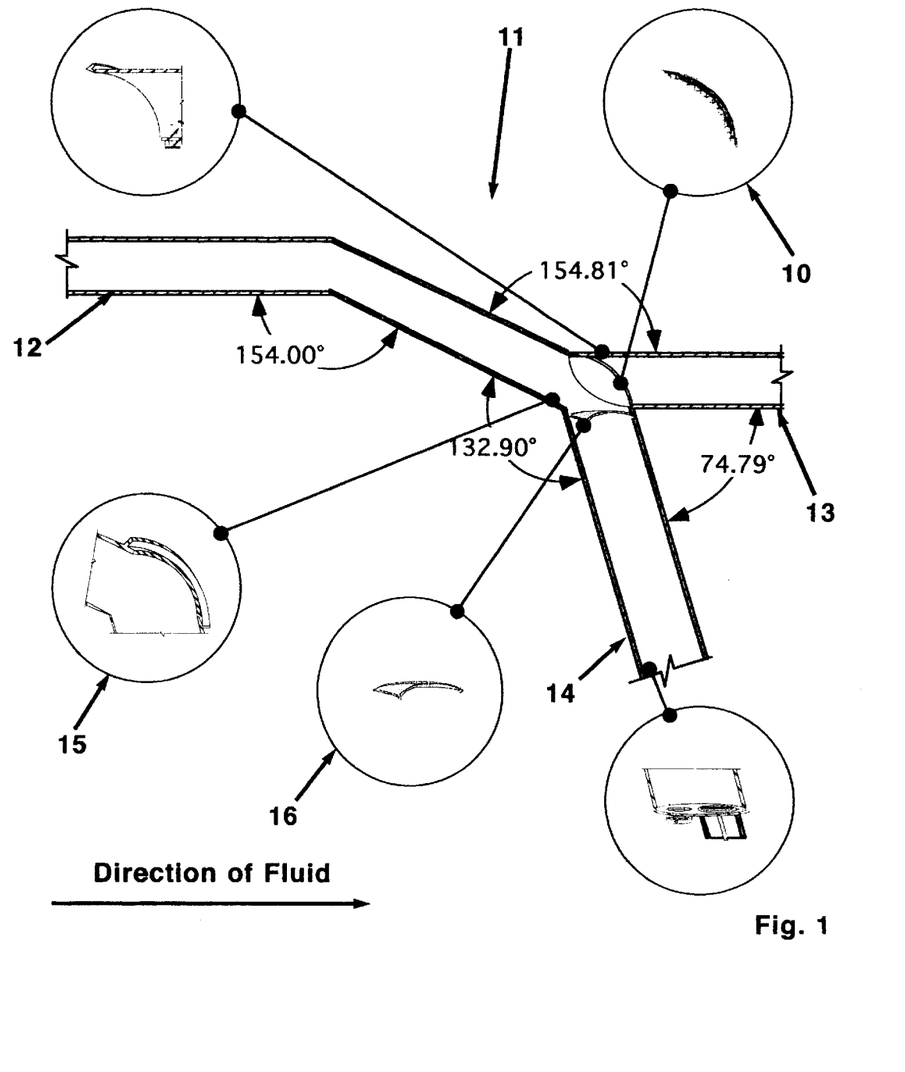
FIG. 1 is a schematic diagram of a filtration apparatus and housing of a preferred embodiment of the present invention.

A filtration apparatus 10 as illustrated in FIG. 1 is located in a housing 11 having an inlet 12, and outlet 13 and a sediment collection chamber 14. In this preferred embodiment of the invention, the inlet 12, the outlet 13 and the sediment collection chamber 14 are pipes having circular cross sections with a three way junction 15. The filtration apparatus 10 is located at the three way junction covering the outlet pipe 13 while a control baffle 16 is at the three way junction 15 positioned at the entrance of the sediment collection chamber 14.

Figure 2:
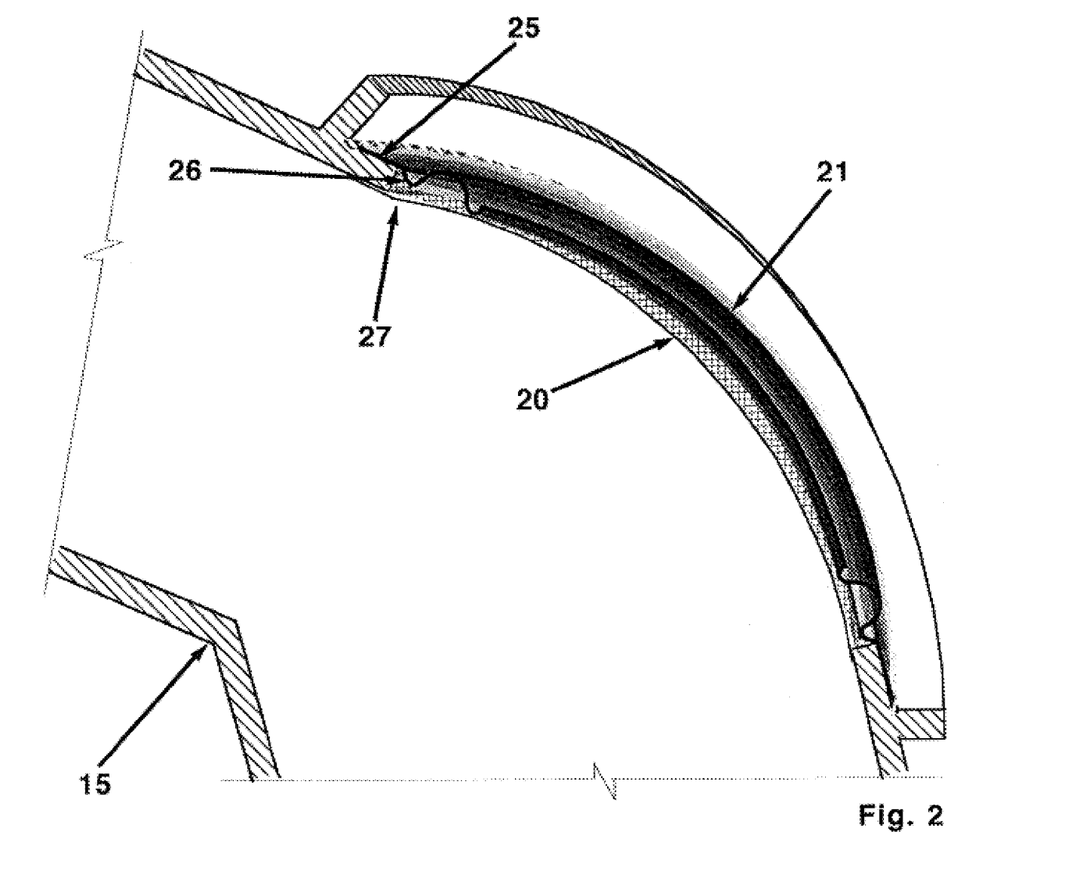
FIG. 2 is a partial longitudinal cross sectional view of the filtration apparatus of FIG. 1 showing the filter housing, filter disc having ribs and filter screen.

The filtration apparatus 10 includes a fine mesh screen 20 and a barrier 21 having vents 22. The fine mesh screen is preferably 50 microns, however this is merely a preferred dimension as the size of the mesh is dependent on the filtration requirements. The barrier (or filter disc) 21 in this embodiment has the form of an oval dish shaped body to fit into the outlet pipe at an oblique angle as illustrated in the drawings. The dish shaped body is merely preferred and the shape can be a flat disc. The barrier 21 will be referred to as the filter disc 21 for clarity. The fine mesh screen 20 takes the same shape as the filter disc 21 as the filter disc 21 abuts against the fine mesh screen 20 on the outlet side of the housing 11.

Figure 3:
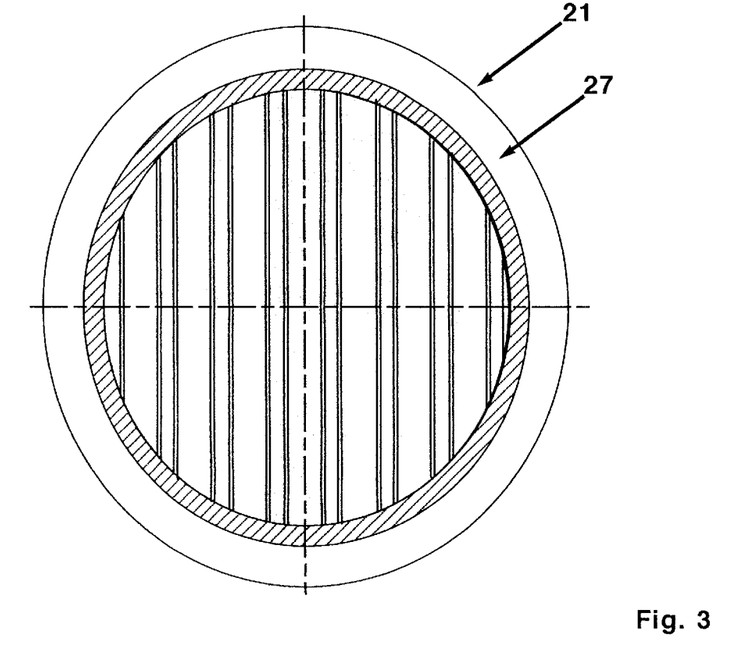
FIG. 3 is a front view of a filter disc of FIG. 2.
Figure 4:
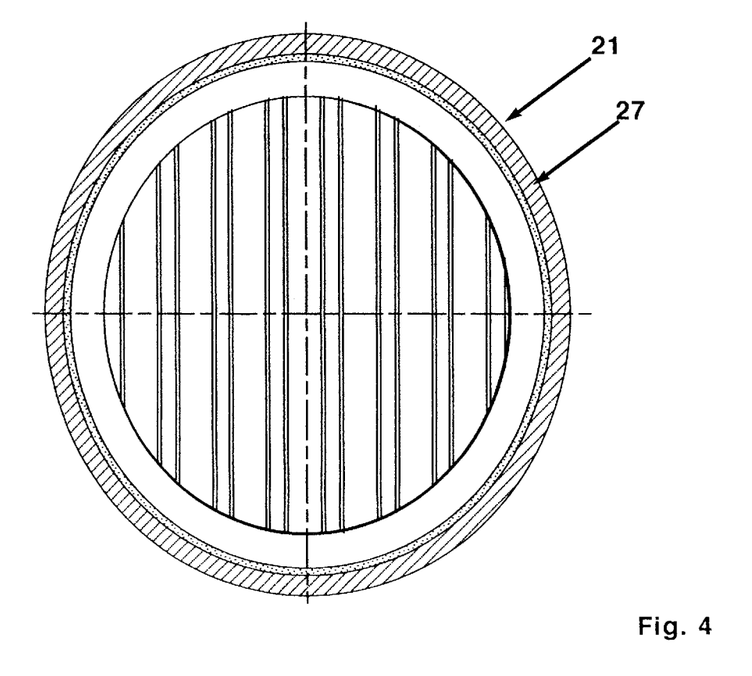
FIG. 4 is a rear view of a filter disc of FIG. 2.
Figure 5:
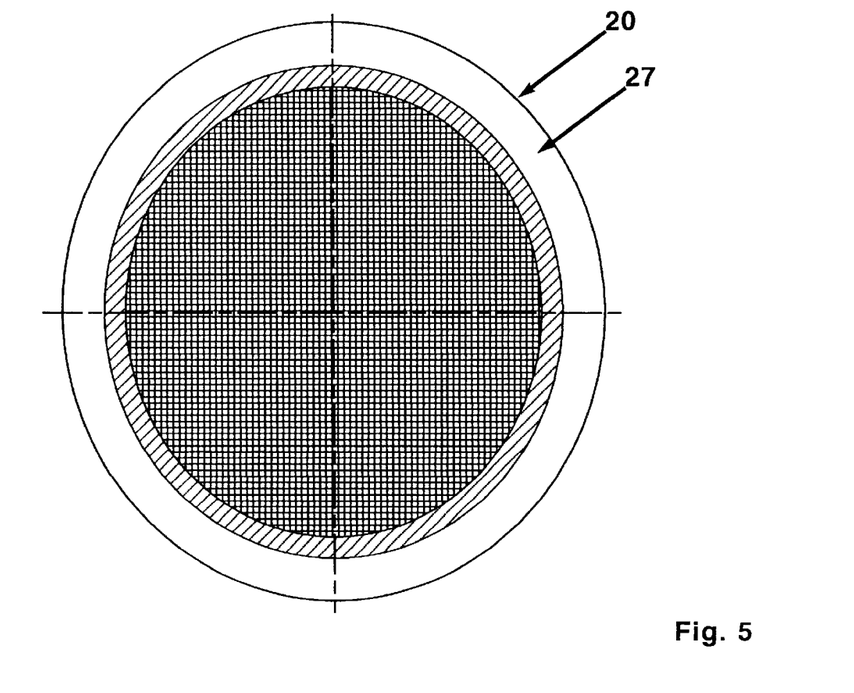
FIG. 5 is a front view of a filter screen of FIG. 2.
Figure 6:
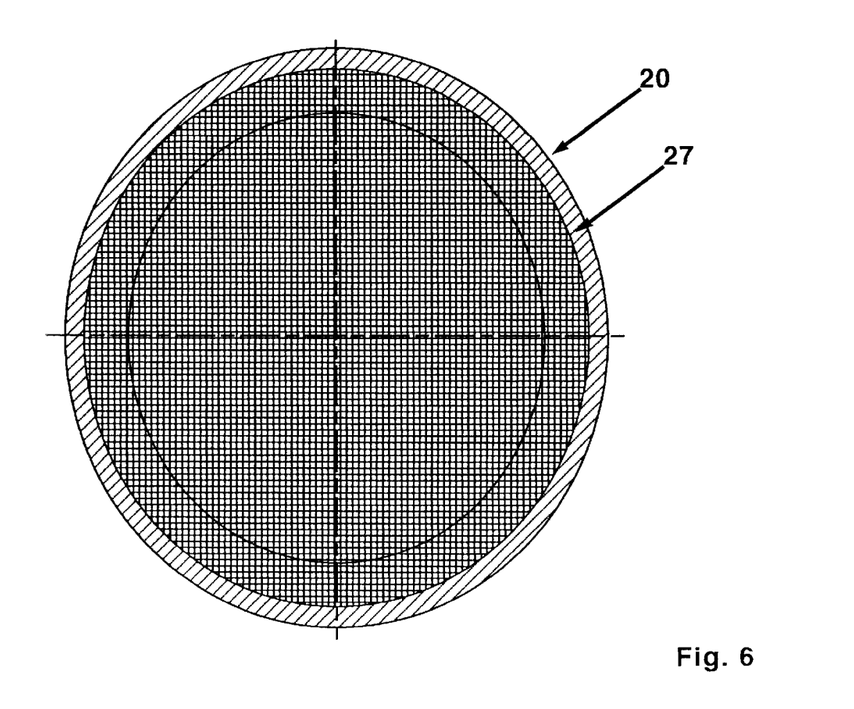
FIG. 6 is rear view of a filter screen of FIG. 2.
Figures 7, 12:
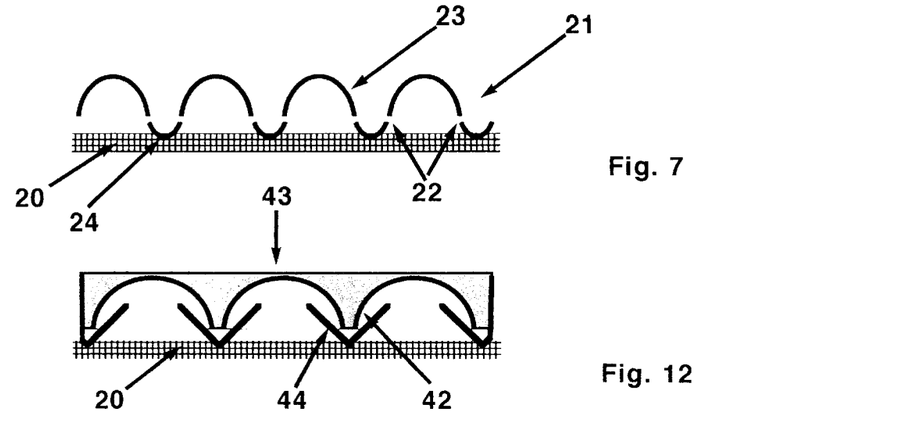
FIG. 7 is a partial schematic transverse cross sectional view of the filter disc of FIG. 2.
FIG. 12 is a partial schematic transverse cross sectional view similar to FIG. 7 of a filter disc of another embodiment.
Figure 8:
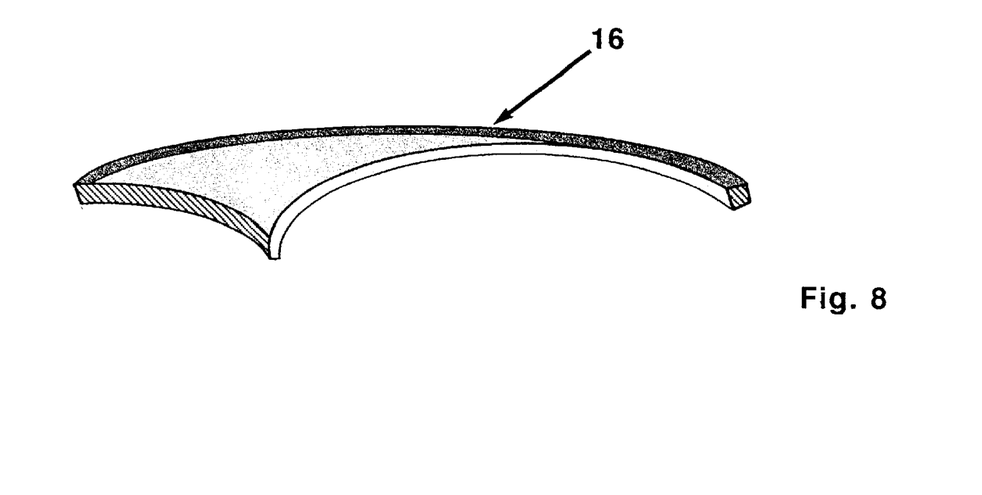
FIG. 8 is a detailed view of a control baffle of the filtration apparatus of FIG. 1.

The filter disc 21 has a number of parallel corrugated ribs 23 with the vents 22 allowing the fluid, preferably water, to pass through. The corrugated ribs 23 of the preferred embodiment are substantially concave when seen from the direction of the flow and the longitudinal axes of the corrugated ribs 24 follow the direction of flow as it is aligned substantially along the side of the inlet pipe 12. It has been found that this alignment provides the best results, however, other alignments are within the scope of the present invention. The vents 22 are slots in the disc 21 located at the edges of the concave corrugated ribs 23 which are joined by intermediate convex portions 24. The vents are preferably located at the point of inflection of the concave corrugated ribs 23 and the convex portions 24. It is seen that the concave corrugated ribs 23 are substantially wider than the convex portions 24.

The filter disc 21 and fine mesh screen 20 are fitted into the housing 11 onto a lip 25 which mates with a corresponding groove 26 in a collar 27 around the circumference of the disc 21 and screen 20.

Figure 9:
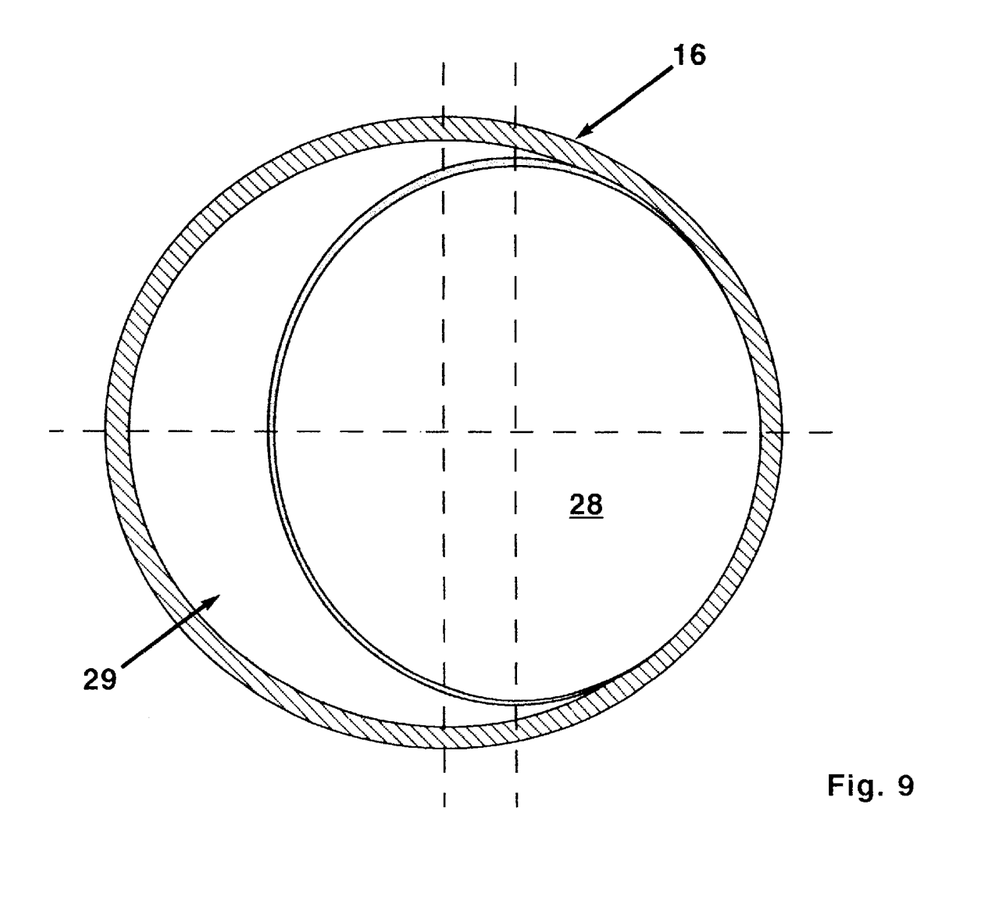
FIG. 9 is a plan view of the control baffle of FIG. 8.

The baffle 16 as illustrated in FIGS. 1 and 9 is provided to control the flow of the fluid after it passes the filtration apparatus 10. The baffle 16 has an opening 28 which allows flow to pass through but an obstruction 29 controls the flow in an upward direction.

Figure 10:
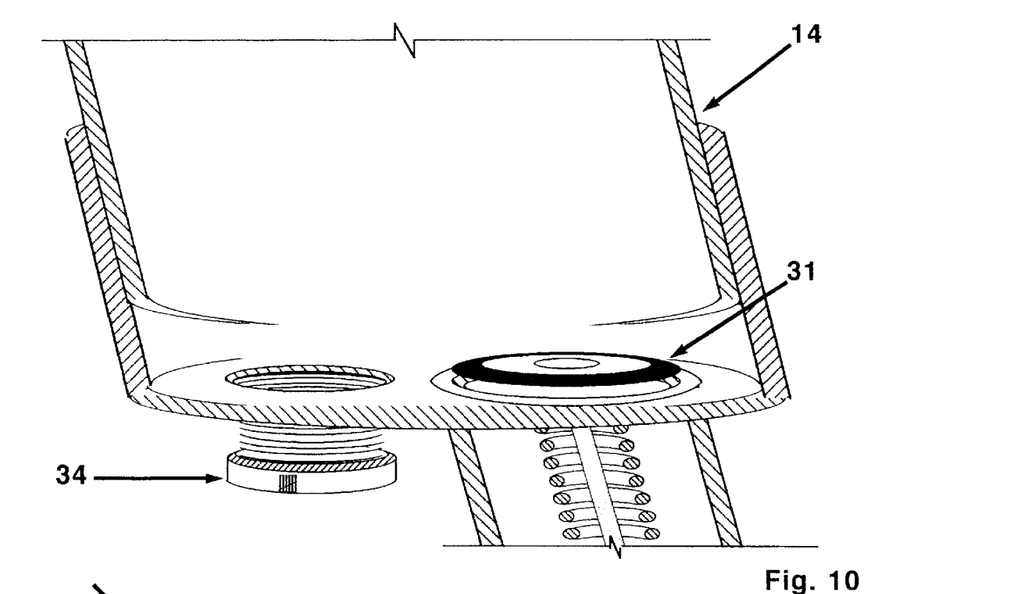
FIG. 10 is a detailed cutaway view of a sedimentation flush valve of the filtration apparatus of FIG. 1.
Figure 11:
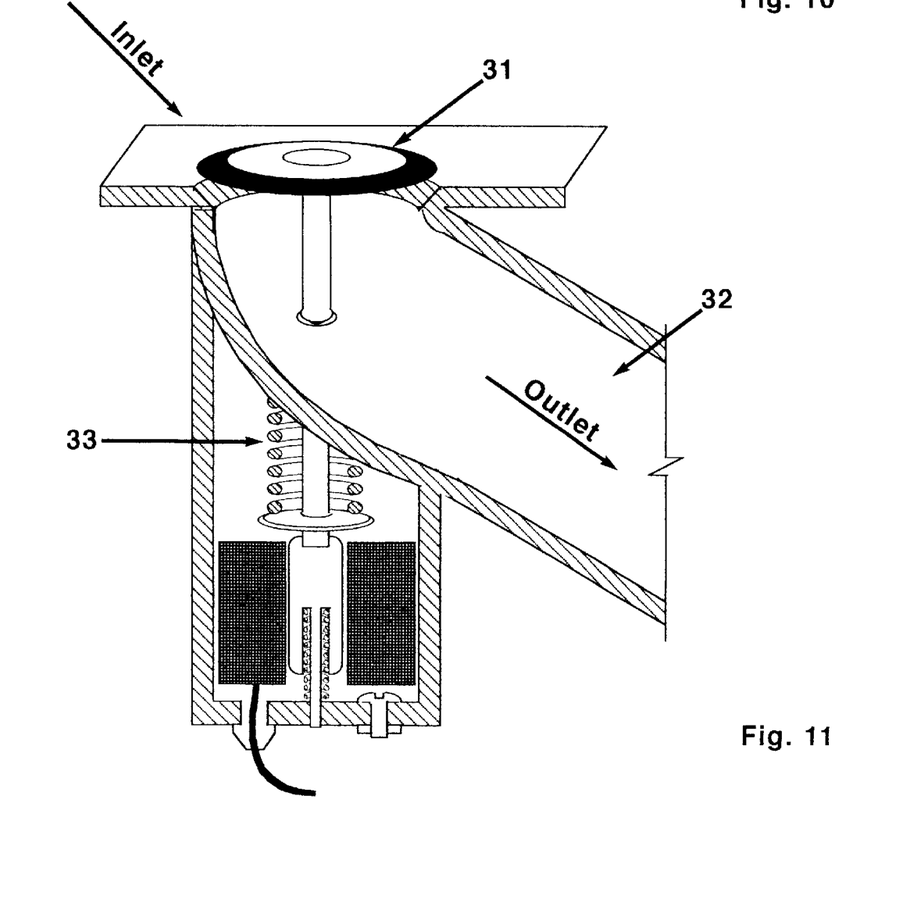
FIG. 11 is a detailed cutaway view of an outlet of the sedimentation flush valve of FIG. 10.

The sediment collection chamber 14 has a flush valve 31 covering a flush outlet 32. The flush valve 31 is preferably operated by a solenoid device 33 and is automatically periodically operable or can be operated when so desired by the usual manner. The sediment collection chamber 14 preferably also has a drain plug 34 to empty same.

The filtration apparatus 10 is used to filter fluids, preferably water or sewage having solid matter and/or particles contained therein. The housing 11 has been devised for the preferred flow of the fluid to interact with the filtration device 10. The diameters of the inlet pipe 12 and the outlet pipe 13 is preferably the same while the diameter of the sediment collection chamber 14 is slightly larger. The inlet pipe 12 preferably has a bend therein and the outlet pipe 13 is preferably parallel and offset from the portion of the inlet pipe furthest away. Preferably, the three way junction has an angle of 74.79° between the outlet pipe 13 and the sediment collection chamber 14, an angle of 154.81° between the outlet pipe 13 and the inlet pipe 12 and therefore an angle of 132.90° between the inlet pipe 12 and the sediment collection chamber 14. The inlet pipe 12 preferably has a bend having an angle of 154°. The preferred angles of the three way junction and the inlet pipe 12 bend assist in the flow of the fluid in the housing 11.

It is seen that the filtration apparatus 10 is positioned at an angle to the flow and the flow and turbulence caused by the control baffle 16 assists the collection of the solid matter and/or particles in the sediment collection chamber 14. The solid matter and/or particles are prevented from returning to the three way junction 15 of the housing 15 after it is filtered from the fluid.

It is believed that the fluid passing through the filtration apparatus 10 interacts with the corrugated ribs 23 and vents 22 to clear the solid matter and/or particles from the fine mesh screen 20 to improve the flow through the filtration apparatus 10 to thereby filter more fluid within a period of time. The fluid is directed from the rear of the corrugated ribs 23 towards the screen 20 to thereby dislodge any solid matter and/or particles held thereon. It has been found that the use of the filtration apparatus 10 of the present invention that the clearing of the screen is substantial and that the requirement for the apparatus to be out of service to effect same is negligible.

Figure 14:
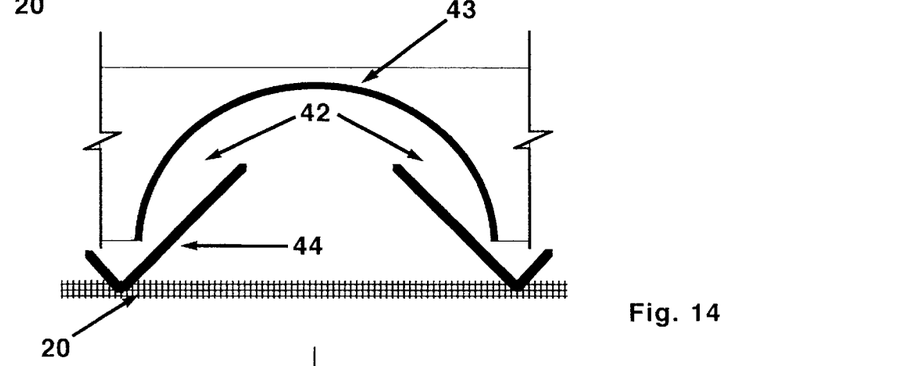
FIG. 14 is a partial schematic transverse cross sectional view of a single rib of the filter disc of FIG. 12 being shown in greater detail.

A filter disc of another embodiment is illustrated in FIGS. 12 and 14. In this embodiment the filtration disc 41 has vents 42 with corrugated ribs 43 therebetween. The convex portions of the previously described embodiment take the form of overhanging intermediate portions 44. The vents 42 are therefore between the edges of the corrugated ribs 43 and the overhanging intermediate portions 44. This embodiment of the filter disc works in substantially the same way as the already described embodiment.

Figure 13:
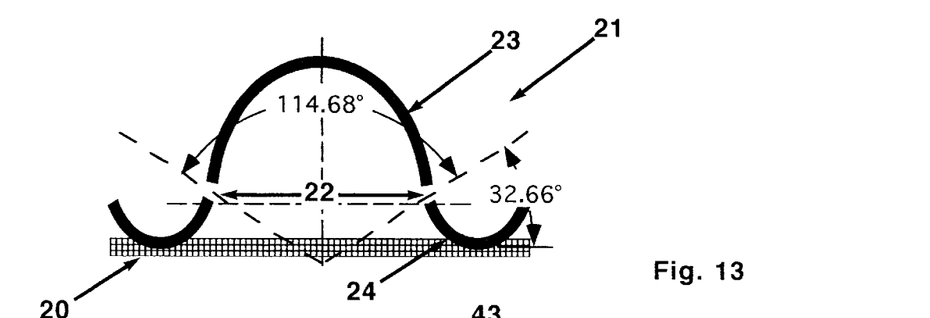
FIG. 13 is a partial schematic transverse cross sectional view of a single rib of the filter disc of FIG. 2 suitable for use with liquid fluids being shown in greater detail.
Figure 15:
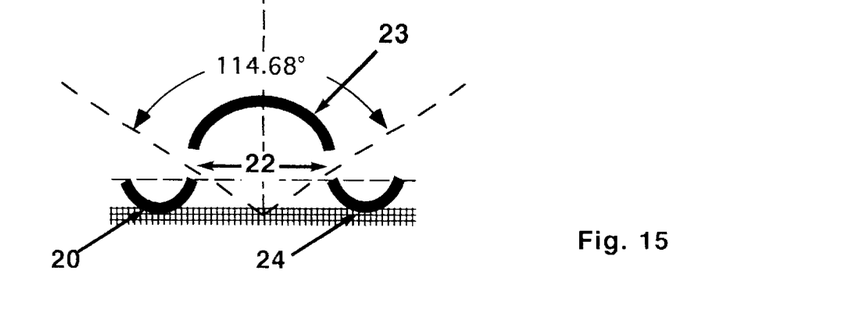
FIG. 15 is a partial schematic transverse cross sectional view of a single rib of the filter disc of FIG. 2 suitable for use with gas fluids being shown in greater detail.

The different relative dimensions of the ribs 23 of the filter disc 21 as illustrated in FIGS. 13 and 15 illustrate the different requirements of the filter disc 21 when used with liquids and gases, respectively. It has been found that for the most efficient use of the apparatus 10 of the present invention that the total area of the vents 22 should approximately equal the total area of the openings of the fine mesh screen 20 when the apparatus 10 is used with liquids. However when the apparatus 10 is used with gases, the total area of the vents should be substantially greater than the area of the openings of the screen. For the best performance of the apparatus 10 and housing 11 when used with both liquids and gases, the sum of the total area of the vents 22 and the total area of the openings in the fine mesh screen 20 should be approximately 150% of the diameter of the inlet pipe 12.

It is seen from the relative dimensions of the rib 23 in FIGS. 13 and 15, that when the apparatus 10 is used for gases instead of liquids, the widths and depths of the ribs 23 are reduced while the spacings of the vents 23 are increased.

Figure 16:
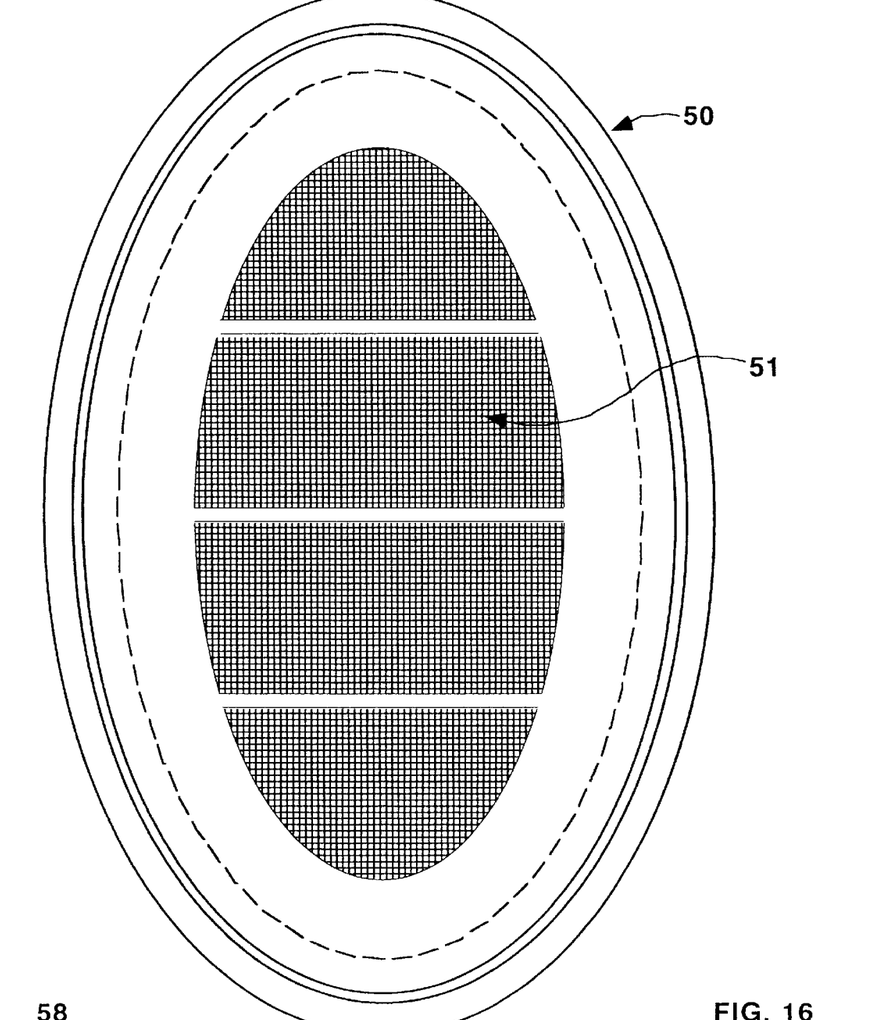
FIG. 16 is a front view of a filter disc and filter screen of a further embodiment.
Figure 17:
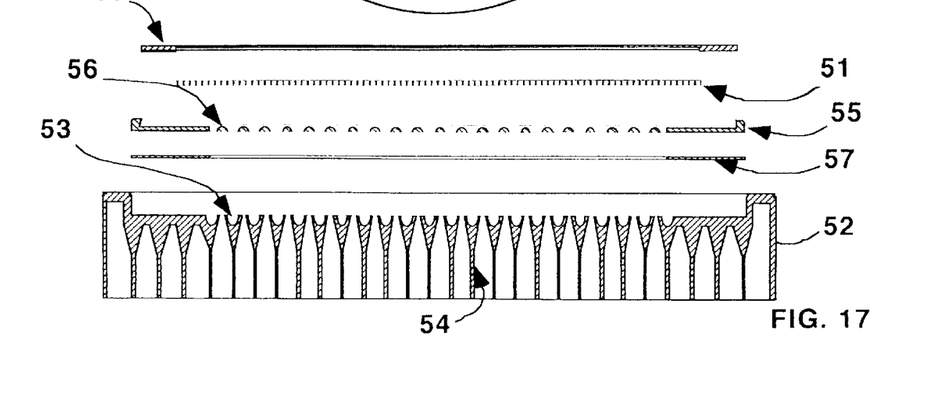
FIG. 17 is an exploded view of the filter disc and filter screen of FIG. 16.

A further embodiment of the filter apparatus in accordance with the invention is illustrated in FIGS. 16 and 17. In this embodiment, the filtration apparatus is in the form of a filter disc 50 having a filter screen 51 in the form of a fine mesh designed to filter solid matter and/or particles from a fluid stream passing through the filter screen 51. As can be seen most clearly in FIG. 17, the filter disc 50 also has a barrier means located on a downstream side of and adjacent to the filter screen 51 and having a plurality of substantially parallel reflector ribs 53 provided therein. Each of the reflector ribs 53 has a concave surface facing substantially in an upstream direction. The reflector ribs 53 are formed with support flanges 54 and together form part of a reflector member 52. The barrier means of this embodiment also includes a deflector member 55 provided with a plurality of intermediate deflector ribs 56 therein. Each of the deflector ribs 56 has a convex surface facing substantially in the upstream direction. A spacer member 57 is located between the deflector member 55 and the reflector member 52 so that in its assembled condition the barrier means is formed with a plurality of fluid vents in the form of elongate gaps located between the spaced apart edges of the reflector ribs 53 and deflector ribs 56. Both the reflector ribs 53 and deflector ribs 56 are arranged parallel to and equidistant from each other with the convex surfaces of the deflector ribs 56 and the concave surfaces of the reflector ribs 53 aligned so as to form a corrugated surface facing substantially in an upstream direction. A retainer member 58 is provided for retaining the filter screen 51 in abutting relationship to the deflector member 55.

In use, a portion of the fluid passing through the filter screen 51 is directed back towards the filter screen 51 by the concave surfaces of the reflector ribs 53. The fluid directed back towards the filter screen 51 dislodges any solid matter and/or particles held thereon so as to clear the filter screen and maintain the fluid flow therethrough. The fluid vents formed by the gaps between the deflector members 56 and reflector members 53 allow the fluid to pass therethrough and out between the support flanges 54.

The foregoing describes only some embodiments of the present invention, and modifications obvious to those skilled in the art can be made thereto without departing from the scope of the present invention.

What is claimed is:

1. A filtration apparatus comprising:
   a filter screen arranged so as to filter solid matter and/or particles from a fluid stream passing through the filter screen; and,
   a barrier means located on a downstream side of an adjacent to said filter screen and having a plurality of reflector ribs provided therein, each of said reflector ribs having a longitudinal axis substantially aligned with the direction of fluid flow and having a concave surface facing substantially in an upstream direction, wherein a portion of the fluid passing through the filter screen is directed back towards the filter screen, the barrier means also having fluid vents provided therein to allow fluid to pass through the barrier means whereby, in use, the fluid directed back towards the filter screen dislodges any solid matter and/or particles held thereon so as to clear the filter screen and maintain fluid flow therethrough.

2. A filtration apparatus as defined in claim 1, wherein said barrier means further comprises a plurality of intermediate deflector ribs provided therein, each of said deflector ribs having a convex surface facing substantially in said upstream direction, wherein said convex surfaces of the deflector ribs and said concave surfaces of the reflector ribs are aligned so as to form a corrugated surface of the barrier means facing substantially in an upstream direction.

3. A filtration apparatus as defined in claim 2, wherein said plurality of reflector ribs are substantially parallel and said plurality of deflector ribs are substantially parallel, and wherein said convex surfaces of the deflector ribs and said concave surfaces of the reflector ribs are aligned so as to form a corrugated surface of the barrier means facing substantially in an upstream direction.

4. A filtration apparatus as defined in claim 3, wherein said fluid vents are in the form of elongate openings located adjacent said reflector ribs.

5. A filtration apparatus as defined in claim 4, wherein said elongate openings are located substantially at a point of inflection of the concave surfaces of the reflector ribs and the convex surfaces of the deflector ribs.

6. A filtration apparatus as defined in claim 3, wherein the concave surfaces of the reflector ribs are substantially wider than the convex surfaces of the deflector ribs and the deflector ribs abut against the filter screen which is in the form of a fine mesh.

7. A filtration apparatus as claimed in claim 3, wherein the convex surfaces of the intermediate deflector ribs overhang spaced apart edges of adjacent concave surfaces of the reflector ribs with the fluid vents being formed by a gap between the overhanging convex surfaces and the adjacent concave surfaces.

8. A filtration apparatus as claimed in claim 7, wherein the overhanging convex surfaces overhang into the area of the concave surfaces.

9. A filtration apparatus as claimed in claim 1, wherein the filtration apparatus is located in a housing having an inlet and an outlet for the passage of the fluid and a sediment collection chamber.

10. A filtration apparatus as claimed in claim 9, wherein a control baffle is provided for controlling the flow of the fluid into the sediment collection chamber which has a sediment flush means to remove the sediment therefrom.

11. A filtration apparatus as claimed in claim 9, wherein the housing comprises an inlet pipe constituting the inlet, an outlet pipe constituting the outlet and a sediment collection pipe constituting the sediment collection chamber.

12. A filtration apparatus as claimed in claim 11, wherein the diameters of the inlet pipe and the outlet pipe are substantially the same whilst the diameter of the sediment collection pipe is larger.

13. A filtration apparatus as claimed in claim 11, wherein the filtration apparatus covers the outlet pipe at a three-way junction of the inlet pipe, the outlet pipe and the sediment collection pipe.

14. A filtration apparatus as claimed in claim 13, wherein a control baffle is provided at said three-way junction for controlling the flow of the fluid into the sediment collection chamber.

15. A filtration apparatus as claimed in claim 14, wherein said three-way junction forms an angle of 74.79° between the outlet pipe and the sediment collection pipe, an angle of 154.81° between the outlet pipe and the inlet pipe and therefore an angle of 132.90° between the inlet pipe and the sediment collection pipe.

16. A filtration apparatus as claimed in claim 15, wherein the inlet pipe has a bend with an angle of 154° to the inlet pipe, having at its inlet a pipe parallel to and therefore offset to the outlet pipe wherein the angles of the three-way junction and the inlet pipe bend assist in the flow of the fluid in the housing.

17. A filtration apparatus as claimed in claim 13, wherein the filtration apparatus is in the form of an oval dish shaped body adapted to fit into the circular pipe at an oblique angle.

18. A filtration apparatus as claimed in claim 17, wherein the oval dish shaped body protrudes towards the outlet pipe.

* * * * *

UNITED STATES PATENT AND TRADEMARK OFFICE
CERTIFICATE OF CORRECTION

PATENT NO. : 6,116,430
DATED : September 12, 2000
INVENTOR(S) : David Robert Horton It is certified that error appears in the above-identified patent and that said Letters Patent is hereby corrected as shown below:

Column 5, line 47, delete "an" and insert --and--.

Column 6, line 41, delete "whilst" and insert --while--.

Signed and Sealed this

Twenty-fourth Day of April, 2001

Attest:

NICHOLAS P. GODICI

*Attesting Officer*  *Acting Director of the United States Patent and Trademark Office*